No. 606,706. Patented July 5, 1898.
M. C. COLLINS.
SKIRT CUTTING RULE.
(Application filed Nov. 26, 1897.)
(No Model.)

Witnesses
C. F. Kilgore
E. D. Merchant

Inventor
Mary C. Collins
By her Attorney
Jos. T. Williamson

THE NORRIS PETERS CO., PHOTO-LITHO., WASHINGTON, D. C.

UNITED STATES PATENT OFFICE.

MARY C. COLLINS, OF MINNEAPOLIS, MINNESOTA.

SKIRT-CUTTING RULE.

SPECIFICATION forming part of Letters Patent No. 606,706, dated July 5, 1898.

Application filed November 26, 1897. Serial No. 659,733. (No model.)

*To all whom it may concern:*

Be it known that I, MARY C. COLLINS, a citizen of the United States, residing at Minneapolis, in the county of Hennepin and State of Minnesota, have invented certain new and useful Improvements in Skirt-Cutting Rules; and I do hereby declare the following to be a full, clear, and exact description of the invention, such as will enable others skilled in the art to which it appertains to make and use the same.

My invention has for its object to provide an improved scale adapted for use in cutting skirts, capes, &c.; and to this end it consists in the novel devices and combinations of devices hereinafter described, and defined in the claims.

The preferred form of my invention is illustrated in the accompanying drawings, wherein like letters indicate like parts throughout both views.

Figure 1:
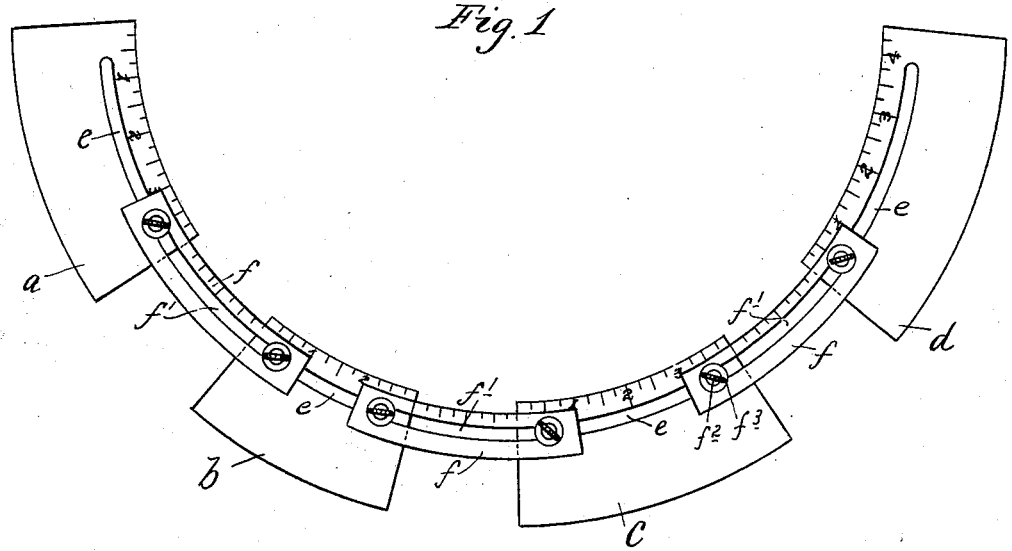
Figure 2:
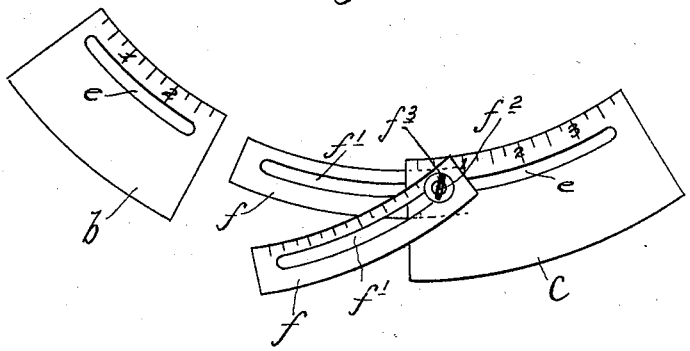

Figure 1 is a plan view of the scale shown as drawn out or extended, and Fig. 2 is a plan view of several disconnected sections of the scale.

As preferably constructed the scale involves four segmental body-sections $a$, $b$, $c$, and $d$. These body-sections are provided with segmental slots $e$. The body-sections above noted are adjustably connected together by means of supplemental scale-sections, which are also preferably segmental in form. These supplemental sections are made up of parallel strips $f$, which are provided with slots $f'$ and extend one above and the other below the body-sections, which they connect. Clamping-screws $f^2$, with thumb-nuts $f^3$, work through the overlapped segmental slots $e$ and $f'$. As is obvious, when the thumb-nuts $f^3$ are tightened the scale-sections will be securely clamped together and held wherever set.

The body-sections $a$, $b$, $c$, and $d$ are graduated on their concave edges in inches and fractions thereof, and in a similar manner the concave edges of the upper members of the supplemental scale-sections $f$ are also graduated in inches and fractions thereof. It will be noted that in the construction shown the body-section $a$ is four inches in extent, while the body-section $b$ is but three inches in extent and the sections $c$ and $d$ are four inches in extent. The supplemental sections $f$ give each joint between the body-sections a possible two inches in expansion.

The scale above described is very serviceable for use in cutting skirts, capes, &c., and it is capable of use in a very great number of different ways, several of which will be here specifically described. Suppose, for example, that the device is to be used to measure the waist-line of a skirt having seven gores. In this case the body-section $a$ may be used to measure the front gore, the body-section $b$ to measure the side front gore, the section $c$ to measure the side back gore, and the body-section $d$ to measure the back. In case any one of the body-sections is not sufficent in extent to measure off the proper fraction of the waist measure for the given gore which it represents the excess or addition may be given by the supplemental scale-section $f$. The scale may be bent on the line of a curve, which will give the proper taper to the gores.

If the scale is to be used to measure the waist-line of a skirt which is to be constructed of a single piece, the body-sections $a$, $b$, $c$, and $d$ should be forced together and used as a continuous scale.

The scale is used to measure the neck of a cape in very much the same manner that it is used to measure the waist-line of a skirt.

The scale may be used in a large number of other ways, which for the purposes of this case need not be gone into in detail, as they will naturally suggest themselves to any person who becomes familiar with the use of the scale.

What I claim, and desire to secure by Letters Patent of the United States, is as follows:

1. A skirt or cape cutting scale comprising a series of segmental body-sections graduated on their concave edges and provided with longitudinal slots, a series of supplemental scale-sections with longitudinal slots, and thumb-screws working in the overlapped slots of said body-sections and said supplemental sections, substantially as described.

2. A skirt or cape cutting scale comprising the graduated segmental body-sections $a$ $b$ $c$ and $d$, with slots $e$, the parallel graduated supplemental scale-sections $f$, with slots $f'$, and the set-screws $f^2$ working in the overlapped slots $e$ and $f'$ and provided with the thumb-nuts $f^3$, substantially as described.

In testimony whereof I affix my signature in presence of two witnesses.

MARY C. COLLINS.

Witnesses:
BESSIE B. NELSON,
F. D. MERCHANT.